July 14, 1970 G. L. ADAMS ET AL 3,520,186
ULTRASONIC FLUID INTERFACE SENSING
Filed March 11, 1968
2 Sheets-Sheet 1

United States Patent Office 3,520,186
Patented July 14, 1970

3,520,186
ULTRASONIC FLUID INTERFACE SENSING
George Leslie Adams, Bay Shore, and Irwin S. Landow, East Meadow, N.Y., assignors to National Sonics Corporation, Farmingdale, N.Y., a corporation of New York
Continuation-in-part of application Ser. No. 565,854, July 18, 1966. This application Mar. 11, 1968, Ser. No. 712,168
Int. Cl. G01f 23/28
U.S. Cl. 73—290
16 Claims

ABSTRACT OF THE DISCLOSURE

Ultransonic systems for fluid testing such as the sensing of liquid-fluid interfaces and especially liquid level sensing in, e.g., storage tanks, bilges and the like, employing a high frequency transducer assembly having transmitting and receiving means (generally enclosed in a sound conductive, e.g., metallic housing of specially adapted cantilever construction minimizing "cross-talk" including a selected "window" thickness of an integral number of half wave-lengths), associated with means responsive to signals received above and selected minimum response level, the systems being characterized by a binary response provided by signal attenuation to a value less than said response level in one of said liquid and said fluid forming said interface.

---

Figure 1:
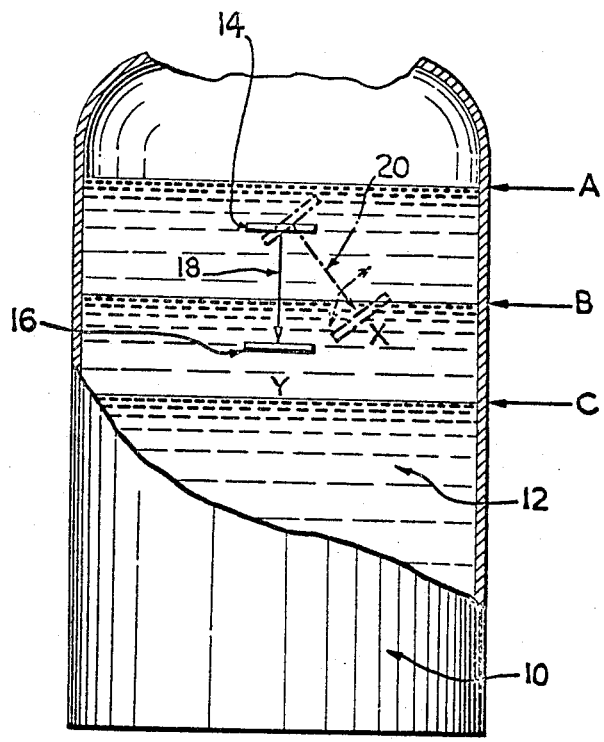

This application is a continuation-in-part of copending application Ser. No. 565,854, filed July 18, 1966, now abandoned, and claims, for matter appearing first therein, the benefit of the priority of Canadian application Ser. No. 995,641, filed July 17, 1967.

This invention relates to the sensing of liquid-fluid interfaces. More particularly, it is concerned with processes and apparatus for detecting liquid-gas and liquid-liquid interfaces employing ultrasonic sensing means.

Many sonic systems are known for the detection of liquid levels or interfaces. Originally, such devices operated on the principle of measuring a characteristic of the sound waves reflected from the liquid surface. Thus, sound waves are continuously emitted into the air space above the liquid in a container, and the phase shift of the received wave, the time required for the return of the primary signal, or the wave form of the reflected signal measured at the receiver, the distance to the liquid surface being calculated or determined by reference to a compilation of standard values.

Since the signal reflects from the container walls and any objects within the container as well as the liquid surface, analysis of the reflected signal is at best difficult, even when a wave form technique is employed. Modified systems mitigated this problem somewhat by generating the signal along the geometric normal to the liquid interface, whereby the signal is transmitted into and through the liquid to a receiver positioned beneath the desired liquid level.

For example, in U.S. Pat No. 2,746,480 there is described such a system whereby a discriminator determines the degree of phase shift of the signal (resulting from passage at a different velocity through the liquid medium), which is proportional to the level of liquid.

The modified devices, however, did not solve a further problem in the analysis of the received signal. Accurate measurement of time or time-related values such as phase shifts on a reflected or continuous wave traveling at sonic speeds over short distances is extremely difficult. Thus, alternate systems, measuring the attenuation of a continuous sonic signal in passage through an air and liquid medium (such as that described in U.S. Pat. 2,960,678), were considered. These devices continuously measure the amplitude of the received wave and permit the calculation of the liquid level by comparison with the amplitude of the transmitted signal. However, what improvement this method of measurement may have introduced was lost at reasonable power inputs because the signal was often severely attenuated to a very low pick-up level, and the mode of calculation of liquid level was still based upon a small change in a continuous signal.

Moreover, in each of the foregoing variant systems, both spurious reflections and standing waves characteristic of the system continued to some degree to adversely affect the accuracy of the values measured.

In a further type of sensor (described, for example, in U.S. Pat. 2,990,482) the acoustical impedance on a single transmitting crystal is measured, i.e., in a liquid, the vibrations of the crystal are damped, thus preventing oscillation in an associated tuned circuit. This system showed some promise, since the output is binary in nature, i.e., the operator need only know whether the system is "on" (oscillating) or "off" (critically damped). However, the entire device often was rendered entirely inoperative by a single drop of liquid deposited on the transmitting surface.

To solve these existing difficulties in the art of sensing liquid levels, a system capable of simply and accurately sensing a liquid-fluid interface without complicated or extensive analytic equipment was developed.

This sensing system, employing a continuous signal but a simple binary response, comprises essentially means for continuously transmitting an ultrasonic signal of at least 500 kc., means for receiving said ultrasonic signal, means for detecting the signal received and, usually, means for amplifying the received signal prior to detection. If desired, the system is suitably connected to means for operating a valve, pump, or a conventional servo mechanism.

Generally, the transmitter and receiver are disposed to provide a straight line signal path therebetween, which signal path intersects (is incident to, transects, or coincides with) the desired liquid interface at angles of incidence of 0 to 90°. The transmitting and receiving means are interchangeably or mutually positioned about, e.g., above or below, the desired liquid interface level in the detection area, and are normally disposed, respectively, on either face of the interface at the desired detection point. Both may, however, be positioned on the same side of the interface in particular embodiments.

Suitably, paired piezoelectric transducers are arranged with one or more amplifiers in a feedback loop capable of oscillation. A detector is generally connected with the feedback loop and includes a bistable or multistable element such as a Schmitt trigger which reflects the oscillation in a separate circuit adapted to operate a suitable servo device. In such a system, random noise initiates operation, but of course the transmitter may be energized in an alternate system by, for example, an alternating current generator such as an oscillator emitting a frequency in the range of the primary transducer crystal resonance. For example, a 1 megacycle oscillator operating at a power level, e.g., in the milliwatt range would be suitable. In either case, a signal is continuously emitted from the transmitter, although it will have insufficient energy to reach the receiver and complete the loop except when a conductive medium is present.

The system is based upon the critical principle that at normal amplifier gains a sonic signal of about 500 kc. or more will not be transmitted in a gas, even over short distances, but will be completely attenuated by the gaseous medium immediately after its transfer from the transmitting crystal. Conversely, the signal is readily propagated through liquids. Hence, a gas-liquid interface is readily sensed as soon as the liquid provides a signal path, for example by filling the gap between the crystals.

Figure 2:
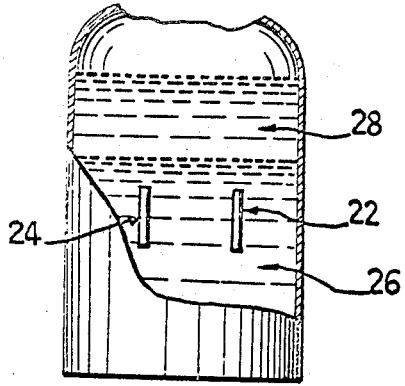
Figure 3:
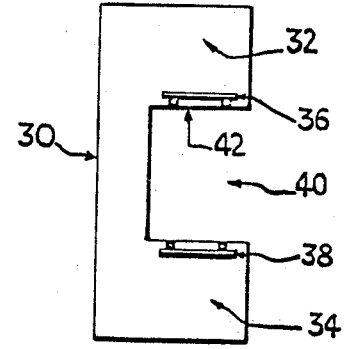
Figure 4:
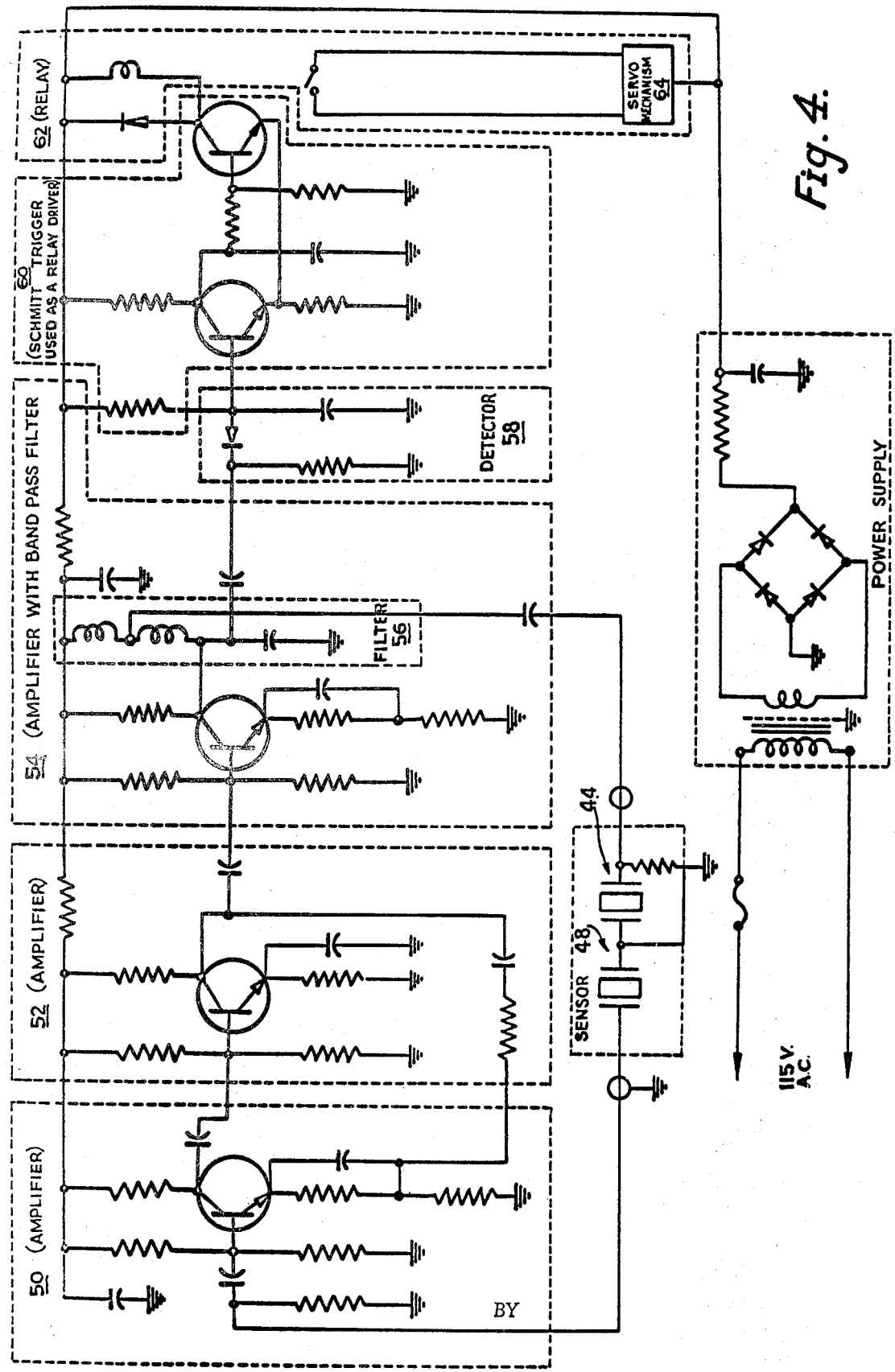

In the drawing FIGS. 1–3 are side elevational views of the system and FIG. 4 shows a diagram of the circuitry associated with the system.

The operation of the system will be understood more readily by reference to FIG. 1 where there appears a side elevation partly in cross-section depicting a container 10 carrying liquid 12 and suitably affixed thereto or suspended therein a lead zirconate-titanate piezoelectric transducer 14 which transmits a 1 megacycle sonic signal to a paired receiver 16 along a short, e.g., 1 to 3 inch straight line signal path indicated at 18 when a liquid fills the space therebetween as in the case of liquid level A. When no liquid appears in the gap as at liquid level C, the signal is entirely attenuated and reaches the receiver, if at all, below the threshold value for the associated amplifier (not shown). Thus, in this embodiment the system is activated (i.e., in the preferred case, is in oscillation) only when a liquid nearly entirely fills the gap between the crystals.

The signal attenuation above results solely from passage through the gaseous medium as when the crystals are in position Y with signal path 18, but it may be effected in an alternate arrangement by at least some reflection or refraction from the liquid-gas interface when the crystals are in position X and the liquid level is at B, in which case the signal path is fractured as indicated at 20. The latter arrangement is also employed when a liquid-liquid interface is being sensed, i.e., when another liquid is the material above the indicated liquid level B. In this variation, the system is activated only when a single liquid fills the gap between the crystals, the signal being attenuated whenever a gas-liquid, or liquid-liquid interface appears therebetween.

In a further modification of the device depicted in FIG. 1, the transmitting and receiving means 14 and 16 are each oriented toward the liquid-fluid interface, and the signal activates the system when reflected from an adjacent interface to the suitably positioned receiver, the signal otherwise (when only liquid is adjacent the sensor) propagating directly into the medium without activating the receiver crystal. Such an arrangement is particularly desirable where it is preferable to position all sensing equipment outside the liquid container.

In this sensing system, as well as those described above, it is of course understood that wherever desirable all or part of the signal path may comprise any sound-conducting medium such as a solid. For example, the signal may be propagated from inside a marine vessel to the exterior thereof, the signal being reflected to a suitably spaced receiver in the vessel whenever air is sensed and otherwise propagating directly into the sea water without activating the receiver. In fact, wherever it is not desirable or possible to penetrate the tank, container, pipe or other vessel, the transmitter and receiver crystals may be attached, e.g., on opposite sides of the exterior wall thereof facing each other, by an adhesive, e.g., conventional cement or epoxy system, a spring, grease with a clamp or other suitable means so the ultrasonic energy can be coupled to the walls in order to be transmitted across the vessel when liquid is present. Similarly, the transmitter and receiver crystals may be isolated from the medium by a suitable conductive rod, or tube especially where the system comprises highly corrosive substances, or is maintained at very high temperatures or pressures.

FIG. 2 shows a similar view of a modified system employed for the sensing of liquid-fluid interfaces, but more particularly adapted for liquid-liquid interfaces, especially where the nature of the respective liquids does not provide a highly reflective or refractive interface suitable for satisfactory operation of the system shown in FIG. 1 in position X.

In this modification, the paired piezoelectric crystals 22 and 24 are arranged at any angle to provide a somewhat longer signal path of, e.g., 6 inches or more. A signal is transmitted and received when liquid 26 forms the path between the crystals but liquid 28, by virtue of its different "acoustical density" will not support the transmission of the signal. The distance between the crystals and the amplifier gain may be adjusted to provide a suitable such response for any pair of liquids. Preferably, the gap between the crystals is at least 5 and more preferably 6–8 inches, and the gain is selected to provide at least a 3:1, more preferably at least a 10:1 signal level difference in the two mediums.

In the preferred system, the received signal is at least partly attenuated and exhibits at least some phase shift by virtue of its passage through a liquid medium, and the system also comprises associated oscillation circuitry employing one or more amplifiers in a feedback loop to provide a binary output. The system attains oscillation whenever the received signal, by virtue of passage through liquid over a sufficient proportion of the signal path, exceeds the threshold value of the initial amplifier and the loop gain is adjusted to exceed unity. Generally, at normal amplifier voltage gains of, e.g., 200–450 volts a signal of 1 megacycle at 1 milliwatt is entirely attenuated in the gas phase over a practically immeasurably small distance, and hence liquid must entirely fill the gap before oscillation occurs. Amplifier gains might, of course, range from multipliers of 100 to 1000 with variant systems, as will be apparent to the artisan.

The total amplifier gain in the oscillation circuit, i.e., the loop gain, is selected, with appropriate reference to the sensor module signal loss in a representative liquid as well as system hysteresis, to yield a sufficiently high wet signal to place the system in oscillation, thus accurately detecting the desired interface. At the same time, of course, the gain is maintained at a value well below that which would cause the system to oscillate when dry, e.g., resulting from the transmission of a signal through the module, or in the presence of the second of two liquid mediums of different acoustic attenuation, to preserve the binary nature of the indicator output. The "wet-to-dry" signal ratio (which may be adjusted in part by geometry modifications described below) characterizing the difference in signals in the indicated and unindicated mediums, is generally at least 3:1 and is preferably at least 10:1. For normal usage, the sensor module is immersed in trichloroethylene, and the amplifier gain is increased until oscillation is achieved (thus correcting for sensor loss and hysteresis) whereupon the gain is set about 20 percent above the first point of actual oscillation.

Thus, each of the aforementioned art difficulties is specifically overcome by the sensing system of this invention. A simple, binary "on-off" response renders the system capable of providing immediate communication of the information sensed. At the same time, accuracy is optimized without calculation, reference to compiled or charted information or the use of sophisticated auxiliary equipment. Moreover, since the system relies upon a received signal, incidental traces of liquid at the transmitting surface have no effect on operability.

The relative simplicity of the system permits operation in virtually all substances including acids such as hydrochloric, hydrofluoric, sulfuric and nitric acids; caustics such as sodium hydroxide, molten salts such as modium chloride; liquid metals such as mercury, sodium, etc.; hydrocarbons such as gasoline, kerosene, benzene and toluene; waxes, greases, gelatins and jellies; paints, including water and oil base types (even containing as much as 70 percent solids); varnishes and lacquers; liquids containing a minor proportion of dissolved or entrapped gases such as boiling water, soda, and beer; cryogenic fluids including liquid nitrogen, oxygen and hydrogen; nitroglycerine, etc.

In addition, the system is perfectly operable through ambient conditions ranging from −450° F. or less to 500° F. or more, and pressures of a few millimicrons up to 10,000 p.s.i.a. or more. Its simplicity, accuracy, and ability to withstand severe operating conditions permits this sensing system to be utilized in generally alien surroundings such as heavy water pools surrounding nuclear reactors, liquid oxygen tanks for rocket motors, storage tanks for sodium cooled nuclear reactors, caustic or strong acid storage tanks, nitroglycerine storage vessels and the like. The system is particularly suitable for liquid detection in marine vessels, including submarines, and it is envisaged that it might be suitable for providing information in an extraterrestrial environment.

Moreover, the measurement of the sonic attenuation of the received signal at given frequencies over a known distance would provide another means for determining the character of an unknown liquid when compared to known values, or even selected characteristics, e.g., temperature, density, pressure, etc., of a known liquid. For example, such characteristics may be determined by emitting a signal into the liquid medium and adjusting amplifier gain to a point permitting oscillation, which point is then compared to a chart of values ascertained on the basis of independent chemical or physical analysis.

Similarly, such a system could be used to control the composition of a binary mixture. In either case, application to quality control programs for measurement of the level of liquid, solid or gaseous impurities or additives is readily achieved, and even unknown or difficultly determined differences between samples may be detected.

For ease of handling, the paired transducers are generally placed in a unitary housing adapted for ready affixation by threading or the like to any suitable container, conduit, etc. However, it should be understood that the crystals might be separately affixed to, e.g., the opposite sides of the container.

In either case, but especially where a unitary housing comprising sound conductive elements is employed, it is essential that the crystals be acoustically isolated to avoid "cross-talk," i.e., the transmission of a sonic signal through the (generally metallic) housing, thereby improperly causing the system to indicate the presence of liquid.

The acoustic isolation of the crystals is effected in part by physically isolating the crystals from the "window" of the housing through which the signal is projected. Generally a substance through which the radial mode of the crystal will not be transmitted, such as plastic, glass or ceramic material is placed between the crystal and the housing "window." Suitably, the crystal is seated on a number of rubber feet and then adhered in position with a thin layer of a conventional epoxy resin. The crystal is also positioned to avoid any direct or indirect contact with a metallic cross member traversing the gap between the crystals. Thus, a cantilever construction as is depicted in FIG. 3 has been found most desirable.

Of course, "cross-talk" resulting from the transmission of the radial mode signal through the metallic structure of the housing can be entirely eliminated where the environment permits the use of a plastic, glass or ceramic housing, in which case the crystals may be seated directly on the housing window by grease coupling, spring loading, and the like.

Of course, since these materials minimize or avoid altogether the dry signal derived from "cross-talk" as compared to a metallic housing, such systems may be modified by increasing amplifier gain, lowering frequency, or reducing the diameter, wherever desirable. Where liquids of particularly high acoustic attenuation (e.g., Avoclor 1260, a soft, sticky, chlorinated hydrocarbon resin plasticizer, spec. gr. 1.618–1.629, manufactured by Monsanto Chemical Co.) are being employed, a nonmetallic housing operating in a high gain system may even be preferred to optimize performance.

Moreover, where at least some cross-talk can be tolerated, such construction features are also suitably employed with a metallic housing. In other variations, the transmitter may be entirely surrounded with a poor sound conductor such as lead, and/or coupled to the housing through a fine metal foil of, e.g., gold, silver, etc. Other techniques for reducing cross-talk, such as joining separate transmitter and receiver housing sections through a welded or threaded joint providing a discontinuous or tortuous signal path may also be utilized.

Any residual "cross-talk" in a metallic housing is best overcome by maximizing the wet-to-dry signal ratios to values of at least 5:1 and preferably at least 10:1. It has been surprisingly discovered that these values are enhanced by window thicknesses (the thickness of the housing at the point of signal transmission) of integral half wave lengths (the crystal wave length at its primary resonance) and optimized at a half wave length. In fact, wet-to-dry signal ratios of as much as 20:1 up to 100:1 or greater have been achieved at half wave length window thicknesses.

While this phenomena is not entirely understood, it is believed that signals reflected from the window back to the crystal may increase the amount of signal generated in the radial mode and the reflection is minimized at the critical wave length values because of reduced mismatch at the transmission surface.

While the gap distance between the crystals would desirably be an integral number of wave lengths to reduce mismatch at the receiving surface, in practice this is impossible since the wave phase is affected by temperature, the nature of the medium, etc.

A gap of 1 to 3 inches is generally suitable, although greater distances of 6–10 inches are usually employed where signal attenuation between two liquids is being measured.

Surprisingly, it has also been found that sensor module diameter critically affects performance in a manner presumably related to the transmission of signals through the metallic cross-member. For example, at smaller diameters (⅜" to ¾") of a metallic module having a regular, generally circular cross-section, higher frequencies or reduced amplifier gains are employed. A ⅞" diameter has been found to provide excellent performance in a cantilevered stainless steel construction having a circular cross-section and employing 1 megacycle transducer crystals with a half wave length window thickness. Thus, under these conditions of ¾" O.D. module exhibited a ratio of wet-to-dry ("cross-talk") signals of 3:1 whereas at ⅞" O.D. the signal ratio was 30:1.

In a preferred embodiment of this invention shown in FIG. 3 the sensing device comprises a stainless steel housing 30 having two chambers 32 and 34 forming each hollow end arm of a C-shaped block, each of said chambers having seated therein a lead zirconate type piezoelectric transducer crystal (36 and 38) positioned to transmit and receive, respectively, an ultrasonic signal of about 1 megacycle across the gap 40 between the opposite arms of the block, the crystal being acoustically isolated from the housing, and the ultrasonic signal being transmitted through the housing at a point 42 where the wall thickness is an integral number of half wave lengths of the characteristic crystal wave length. The crystals employed in these devices are generally of the piezoelectric type, including barium titanate, lead zirconate, lead metaniobate crystals, etc., although it should be noted that any transducer providing a sonic signal in excess of about 500 kc. would be suitable. Available magnetostrictive and ferromagnetic devices do not attain frequencies much in excess of 100 kc. and hence are not suitable at present.

While crystal frequencies of 500 kc. up to 3–5 megacycles or more are perfectly suitable, values lower than about 500 kc. are undesirable since the sonic signal would be transmitted through both gas and liquid at normal amplifier gains (in fact, most of the early devices operated at frequencies of 40–150 kc.); and frequencies much in excess of 5 megacycles, e.g., 10–15 megacycles must be selected carefully with reference to the proposed use, since some liquids will effect sufficiently high sonic attenuation at those frequencies to completely block the signal. Of course, this range is particularly well suited for the measurement of liquid-liquid interfaces with a simple sensing system according to this invention since one of the liquids, as noted above, will act like a gas at 1 megacycle and completely attenuate the signal below the response level. The higher frequencies of 1 megacycle and above are particularly preferred in order to minimize cross-talk through the sensor module, and thus are normally employed with sensors of small diameter. In addition, such high frequencies are preferred where it is desired to detect small physical difference in sample materials.

Frequencies of 750–1250 kc., preferably 900–1100 kc., are generally employed with amplifier gains of about 200 to 500 preferably 225 to 450 volts. It is understood, of course, that higher frequency signals, being more easily attenuated, generally require higher amplifier gains.

As described above, the sensor is normally disposed in the system in a manner providing a signal path generally normal to the liquid surface to be sensed. However, where a liquid-liquid interface is being sensed, the sensor may be placed at an acute angle of generally less than 20°, e.g., 3–18° and preferably 5 to 15° so that reflection and refraction effects may also be utilized in attenuating the signal. Similarly, the crystals may be positioned in a conductive medium, each oriented angularly to a fluid-liquid interface, and the receiver adjusted to respond to a signal reflected from the interface.

The sensor may, of course, also be oriented horizontally to the liquid surface, where the signal is completely attenuated until the liquid covers a sufficient portion of the respective crystals to reach the threshold value of the amplifiers. Moreover, where a liquid-liquid interface is being sensed the sensor is preferably disposed horizontally in one medium. This variant is perfectly operable in a vertical position, however, as in a bilge pump, responding at a point when a sufficient part of the signal path comprises a single liquid.

It is of course understood that one or more of the sensors or the individual transducers may be selectively spaced about the detection area in any otherwise suitable manner, or connected to the detection area through any sound conducting medium such as a metallic tube, which arrangements will generally have no adverse affect on operation. Moreover, the sensor module may be movably mounted in the sensing region to perform the function of a continuous lever sensor with the other advantages of the system described hereinabove. Suitably, the sensing system may be mounted in a pipeline, or even in a filling nozzle.

The circuitry associated with the sensor is depicted in its preferred version in FIG. 4, wherein 44 is a lead zirconate-titanate piezoelectric crystal capable of transmitting a signal of about 1 milliwatt at about 1 megacycle, 46 is a matched receiver crystal and the primary circuit comprises the aforesaid crystals arranged with a short gap 48 of about 6 inches therebetween (suitably arranged to transect the fluid interface) and coupled to a series of amplifiers 50, 52 and 54 through a band pass filter 56 in a feedback loop. The presence or absence of oscillation in the primary circuit is reflected in the output of a silicon diode detector 58 which rectifies and filters the output of the primary circuit. A bistable Schmitt trigger 60 senses the voltage level at the detector output and serves to actuate a relay 62 controlling servo mechanism 64.

The oscillation circuitry is preferably of relatively wide band width, e.g., 3 to 3.5 megacycles, while the band pass filter generally has a band width of little more than 0.5 megacycle. The system is selected to provide a gain change from gas to liquid of at least 10 db, and preferably 20 db (voltage ratio 10:1), and the loop gain sensitivity is adjusted to a level about 10–20 percent above the point of initial oscillation in the indicated medium, i.e., below the minimum received signal in the indicated medium, e.g., liquid and well above the maximum received signal in the unindicated medium, e.g., gas.

Summarizing normal construction and operational adjustment procedures, the crystal frequency is selected to minimize cross-talk in the module construction and to secure the transfer of a satisfactory signal across the liquid being sensed; the wet-to-dry signal ratio is optimized by selection of window thickness, module materials and geometry, and especially diameter and location of cross-members; and the feedback loop gain is adjusted to exceed unity as described, overcoming sensor and circuit losses and hysteresis effects, and permitting oscillation when a liquid is present in the module gap, without exceeding the value at which the dry signal (or the signal transmitted through another liquid of higher acoustic attenuation) would be sensed.

While the sensing system of this invention has been described hereinabove with reference to its preferred features and embodiments, no limitation is intended thereby, it being understood that many variations therein within the ordinary skill of the artisan may be made without departing from the spirit of the invention.

The embodiments of the invention in which an exclusive property or privilege is claimed are defined as follows.

1. Apparatus for the detection of liquid-fluid interfaces, comprising:
   first means for transmitting an ultrasonic signal having a frequency of at least 500 kilocycles from a first station,
   second means for receiving said ultrasonic signal at a second station,
   said first and second means being disposed in a housing adapted for immersion in the interface region,
   said transmitting and receiving means being oriented to provide a fluid signal path therebetween,
   said receiving means including an output means for providing output signals representing the received signals, signal detection means coupled to the output means to monitor the output signals, said detection means being responsive to register output signals received above a selected minimum response level.

2. The apparatus of claim 1, wherein said housing comprises a sound conductive element and the housing thickness at the point of incidence of the transmitted ultrasonic signal is an integral number of half wave lengths of the ultrasonic signal.

3. The apparatus of claim 1, wherein said minimum response level is matched to a value intermediate the different signal levels, as between said liquid or said fluid alone and said interface region therebetween.

4. The apparatus of claim 1, wherein said detection means constitutes a feedback loop comprising at least one amplifier, wherein the feedback loop gain exceeds unity.

5. The apparatus of claim 4, wherein the loop gain sensitivity lies at least about 10 percent below the minimum received signal in the indicated medium.

6. The apparatus of claim 1, wherein said housing constitutes a cantilever structure substantially in a C-shaped configuration wherein the transmitting and receiving means are located in the extremities thereof and are disposed to provide a signal path across the central gap therebetween.

7. The apparatus of claim 6, comprising a sound conductive element in said housing structure bridging the first and second stations, said housing having a cross sectional dimension transversely of the signal path of between about 3/8 and 7/8 inch.

8. The apparatus of claim 7, characterized by a received signal level ratio in the respective mediums of at least 3:1.

9. A system for the detection of liquid-fluid interfaces formed between a liquid and a fluid, comprising:
   first means for transmitting an ultrasonic signal having a frequency of at least 500 kilocycles from a first station.
   second means for receiving said ultrasonic signal at a second station,
   said first and second means being disposed in a structure including a sound conductive element bridging the first and second stations,
   said first and second stations defining therebetween a fluid signal path intersecting the desired level of the interface,
   said signal being attenuated below a selected minimum response level in one of said liquid and said fluid forming said interface, and being received above said minimum response level in the other of said liquid and said fluid,
   said system being characterized by a received signal level ratio in the respective mediums of at least 3:1.

10. The system of claim 9, also comprising means for registering the receipt of said signal at said second station.

11. The system of claim 9, also comprising means for controlling the operation of an associated servo-mechanism.

12. The system of claim 9, wherein said transmitting means is a piezoelectric transducer crystal having a characteristic primary resonance of at least 500 kilocycles up to about 5 megacycles.

13. Apparatus for the detection of liquid-fluid interfaces, comprising:
   means for transmitting an ultrasonic signal having a frequency of at least 500 kilocycles from a first station,
   means for receiving said ultrasonic signal at a second station,
   a housing comprising a sound conductive element for said transmitting and receiving means,
   said transmitting and receiving means being disposed in said housing to provide a signal path therebetween across a gap external of said housing,
   the housing thickness at the point of incidence of said ultrasonic signal being an integral number of half wave lengths of the ultrasonic signal.

14. The apparatus of claim 13, wherein said transmitting and receiving means are each piezoelectric transducer crystals having a primary resonance of at least 500 kilocycles up to about 5 megacycles, and said housing thickness is one half wave length of the ultrasonic signal at said primary resonance.

15. The apparatus of claim 14, wherein said transmitting and receiving means are coupled in a feedback loop comprising at least one amplifier, wherein the feedback loop gain exceeds unity.

16. The apparatus of claim 15, having a signal level ratio in the respective mediums of at least 10:1.

References Cited

UNITED STATES PATENTS

| | | | |
|---|---|---|---|
| 2,960,678 | 11/1960 | Beard et al. | 340—1 |
| 3,010,318 | 11/1961 | Mongan | 73—290 |
| 3,213,438 | 10/1965 | Felice et al. | 340—244 |
| 3,214,974 | 11/1965 | Altman et al. | 73—290 |
| 2,990,543 | 6/1961 | Rod | 340—244 |

FOREIGN PATENTS

| | | |
|---|---|---|
| 809,681 | 3/1959 | Great Britain. |
| 813,497 | 5/1959 | Great Britain. |

DONALD O. WOODIEL, Primary Examiner

Disclaimer and Dedication

3,520,186.—*George Leslie Adams,* Bay Shore and *Irwin S. Landow,* East Meadow, N.Y. ULTRASONIC FLUID INTERFACE SENSING. Patent dated July 14, 1970. Disclaimer and Dedication filed Nov. 19, 1981, by the assignee, *National Sonics Corp.*

Hereby disclaims and dedicates to the Public claims 1 and 3 through 12 of said patent.

[*Official Gazette November 29, 1983.*]